US006848762B2

(12) United States Patent
King et al.

(10) Patent No.: US 6,848,762 B2
(45) Date of Patent: Feb. 1, 2005

(54) INK LEVEL SENSING

(75) Inventors: William F. King, Eagle, ID (US); Angel L. Enriquez, Afiasco, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/423,357

(22) Filed: Apr. 25, 2003

(65) Prior Publication Data

US 2004/0212643 A1 Oct. 28, 2004

(51) Int. Cl.[7] .......................... B41J 2/195; B41J 29/38; G01F 25/30

(52) U.S. Cl. ............................... 347/7; 347/14; 73/308

(58) Field of Search ............................... 347/7, 14, 19, 347/86, 88, 85, 87; 47/87; 73/1.73, 308, 861.02, 861.03

(56) References Cited

U.S. PATENT DOCUMENTS 4,627,283 A * 12/1986 Nishida et al. ............... 73/313
4,966,207 A * 10/1990 Howard et al. ............... 141/98
5,562,003 A * 10/1996 Lefebvre ..................... 73/308
5,694,156 A 12/1997 Hoisington et al.
5,758,224 A 5/1998 Binder et al.
5,966,144 A 10/1999 Edwards
6,155,664 A * 12/2000 Cook ............................ 347/7
6,196,651 B1 3/2001 Zuber et al.
6,431,670 B1 8/2002 Schantz et al.

FOREIGN PATENT DOCUMENTS

JP 2000343721 A * 12/2000 ............ B41J/2/175

OTHER PUBLICATIONS

Precision Controls Company, “Bimetal Discs”, www.precision–controls.com/BimetalDisc.htm.
Precision Controls Company, “Circuit Breakers”, www.precision.controls.com/CircuitBreaker.htm.

* cited by examiner

*Primary Examiner*—Stephen D. Meier
*Assistant Examiner*—Alfred Dudding

(57) ABSTRACT

Ink reservoirs containing binary elements facilitate discrete sensing of ink level within the reservoir. The binary elements are adapted to provide an electrical path in response to an applied electrical signal if the element is immersed in the ink. The binary elements are further adapted to present an open circuit in response to the same applied electrical signal if the element is above a level of the ink. The binary elements may be single-use or multi-use elements, i.e., their state change may be irreversible or reversible, respectively. Based on the presence or absence of an electrical path, the ink level can be deemed to be at or above a level of the binary element, or below the level of the binary element, respectively.

22 Claims, 7 Drawing Sheets

INK LEVEL SENSING

FIELD OF THE INVENTION

The present invention relates generally to sensing of ink level within an ink reservoir for use in a printing system.

BACKGROUND

A variety of printing systems, e.g., printers, copiers, facsimile (fax) machines and multifunction devices, utilize ink as a marking material. The ink is contained in ink reservoirs often referred to as cartridges. The ink is a liquid, and often an aqueous liquid.

As the printing system deposits the ink on print media, the level of ink in the cartridge will drop, eventually falling to a level where ink can no longer be delivered from the cartridge. At this point, the cartridge is deemed to be "empty" even though there is generally some quantity of ink retained in the cartridge.

It is generally advantageous to know when an ink cartridge is close to being empty in order to give a consumer or other end user an opportunity to purchase a fresh cartridge. Additionally, operation of a printer with a depleted ink supply may lead to loss of important information. For example, a printing system printing a facsimile message may receive the transmitted information and operate as if the received information is being printed. If the ink is depleted, the information is never printed. Unless the receiver can ask the sender to retransmit the fax, the information is irretrievable.

Knowing the relative ink level of the ink cartridge may be important under other considerations. For instance, before beginning a large print job, it would be useful to know the likelihood that the remaining ink is sufficient to finish the print job. If the amount of ink is insufficient, the ink cartridge can be replaced or replenished before it reaches its empty state in order to avoid wasting time, paper, and effort of unsuccessfully attempting to print the large print job.

For the reasons stated above, and for other reasons stated below that will become apparent to those skilled in the art upon reading and understanding the present specification, there is a need in the art for alternative methods and apparatus for indicating ink level within an ink reservoir for use in a printing system.

SUMMARY

Ink reservoirs containing binary elements are described herein to facilitate discrete sensing of ink level within the reservoir. The binary elements are adapted to provide an electrical path, or closed circuit, in response to an applied electrical signal if the element is immersed in the ink. The binary elements are further adapted to present an open circuit in response to the same applied electrical signal if the element is above a level of the ink. The binary elements may be single-use or multi-use elements, i.e., their state change may be irreversible or reversible, respectively. Based on the presence or absence of an electrical path, the ink level can be deemed to be at or above a level of the binary element, or below the level of the binary element, respectively.

Further embodiments of the invention include methods, apparatus and systems of varying scope.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1:
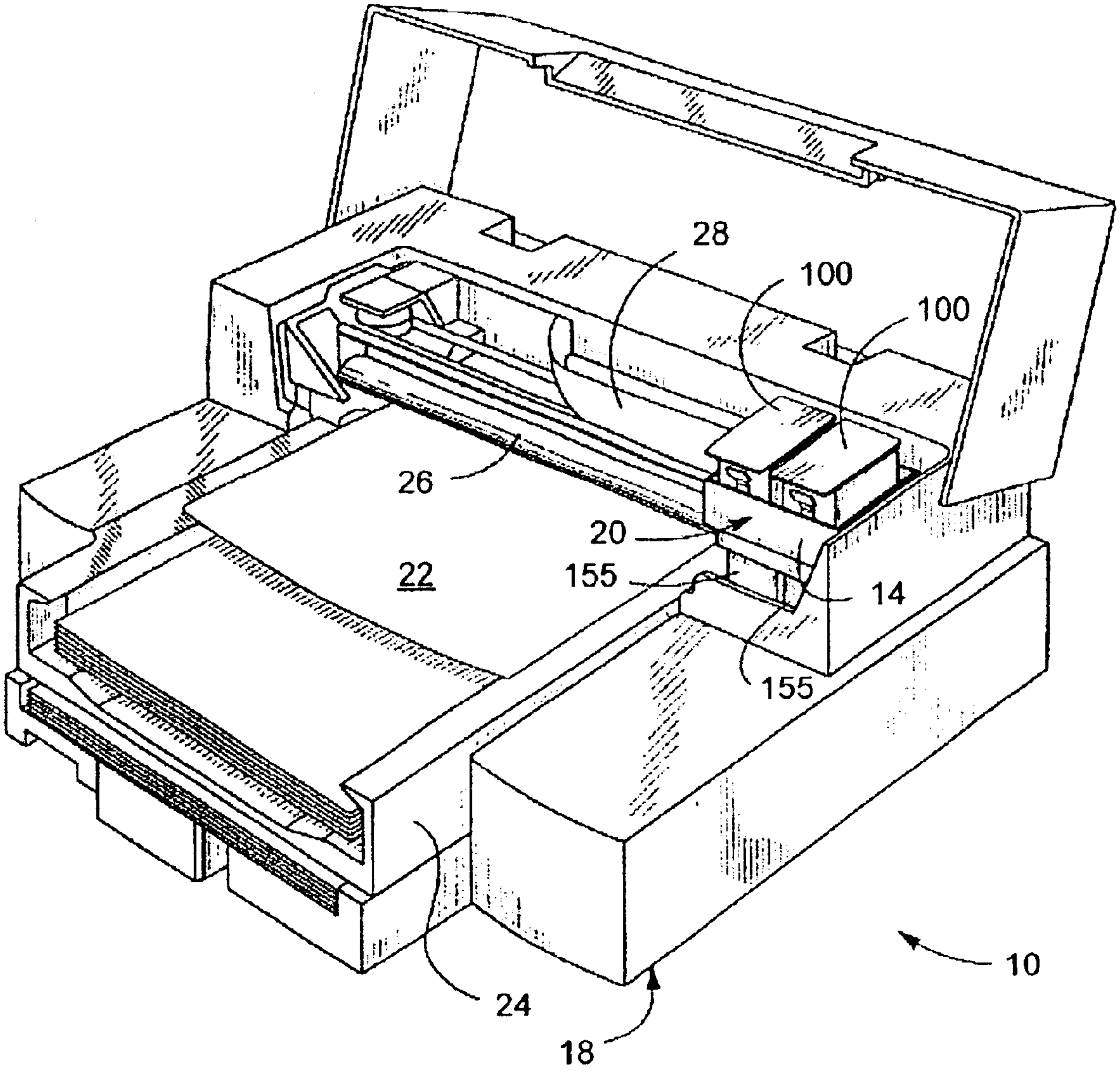
FIG. 1 is a perspective view of one exemplary embodiment of a printing system in accordance with an embodiment of the invention.

FIG. 1 is a perspective view of one exemplary embodiment of a printing system 10 shown with its cover open that includes at least one replaceable ink reservoir 100 that is installed in a receiving station 14. At least one of the replaceable ink reservoirs 100 is adapted to provide an indication of ink level in accordance with an embodiment of the invention.

In operation, ink is provided from the replaceable ink reservoir 100 to at least one inkjet printhead 155. The inkjet printhead 155 is responsive to activation signals from a printer portion 18 to deposit ink on print media 22. The inkjet printhead 155 may be integral to the replaceable ink reservoir 100 or the ink reservoir 100 may be removably installed in the printing system 10 in flow communication with the printhead 155. In either case, each ink reservoir 100 is in flow communication with its printhead 155.

For one embodiment, the replaceable ink reservoir 100, receiving station 14, and inkjet printhead 155 are each part of a scanning carriage that is moved relative to print media 22 to accomplish printing. The printer portion 18 includes a media tray 24 for receiving the print media 22. As the print media 22 is stepped through a print zone, the scanning carriage 20 moves the printhead 155 relative to the print media 22. The printer portion 18 selectively activates the printhead 155 to deposit ink on print media 22 to thereby accomplish printing.

The scanning carriage 20 is moved through the print zone on a scanning mechanism that includes a slide rod 26 on which the scanning carriage 20 slides as the scanning carriage 20 moves through a scan axis. A positioning means (not shown) is used for precisely positioning the scanning carriage 20. In addition, a paper advance mechanism (not shown) is used to step the print media 22 through the print zone as the scanning carriage 20 is moved along the scan axis. Electrical signals are provided to the ink reservoir 100 for selectively activating the printhead 155 by means of an electrical link such as a ribbon cable 28. Similarly, electrical signals are provided between the ink reservoir 100 and the printing system 10 for the purpose of sensing ink level, preferably through the same electrical link. The various components for moving a printhead 155 relative to the print media 22, which may include moving one or both of the printhead 155 and print media 22, may be referred to as a printer engine.

It will be recognized that replaceable ink reservoirs 100, often referred to as ink cartridges, may come in a variety of form factors and may be usable in a variety of printing systems including, for example, printers, facsimile (fax) machines, copiers and multifunction devices. Similarly, the ink reservoirs 100 may contain a single ink color, e.g., cyan, magenta, yellow or black, or they may be compartmentalized to contain more than one ink color.

Figure 2:
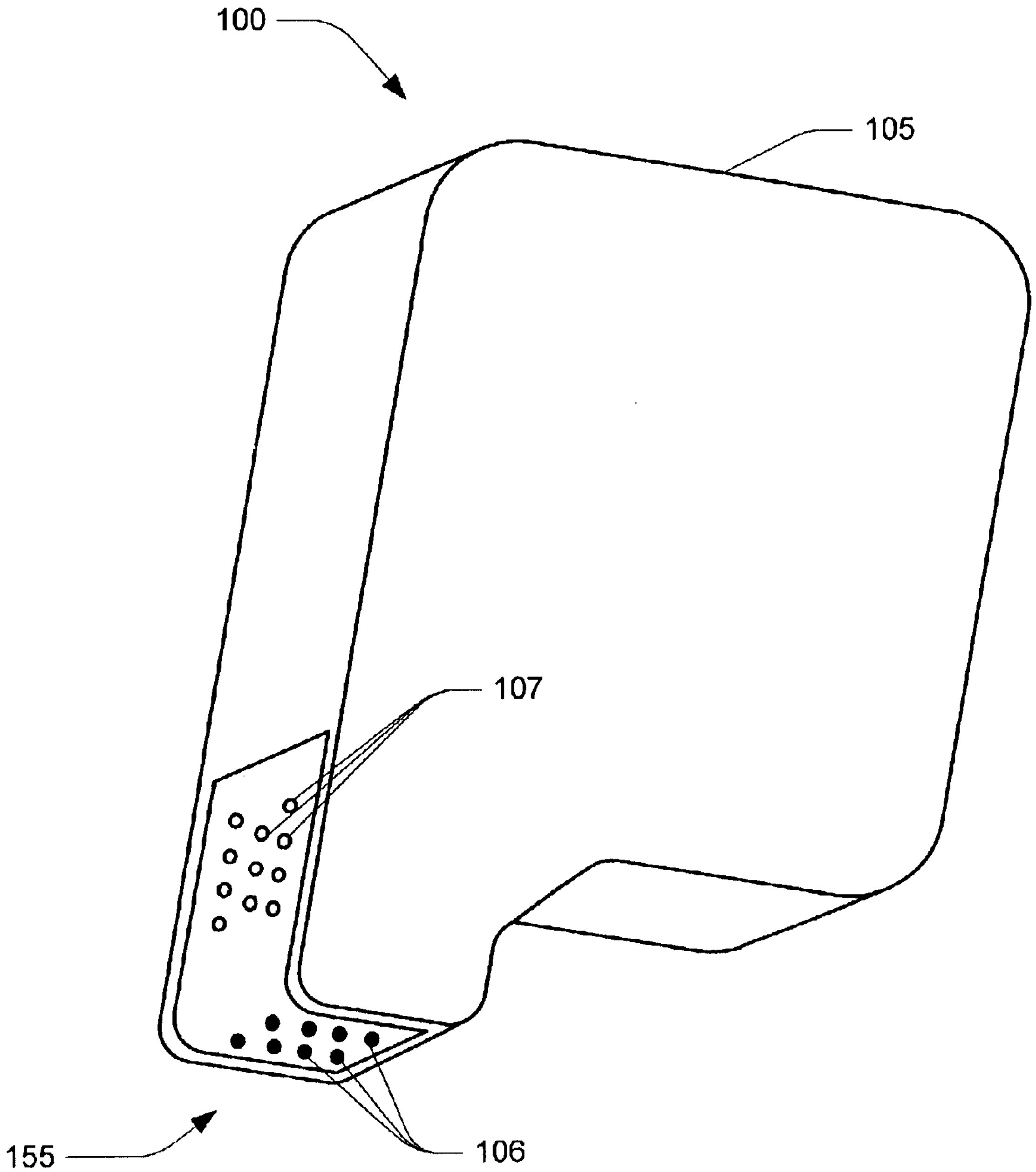
FIG. 2 is a perspective view of an ink reservoir in accordance with one embodiment of the invention.

FIG. 2 is a perspective view of an ink reservoir 100 in accordance with one embodiment of the invention. The ink reservoir 100 includes a body 105. A printhead 155 is integral to the body 105. The printhead 155 includes ink ejectors 106 for dispensing ink onto a print media. The ink ejectors 106 are controlled by various electrical signals received at one or more contacts 107. Some of the contacts 107 are further used to detect ink level within the body 105 as described with reference to FIG. 3.

Figure 3:
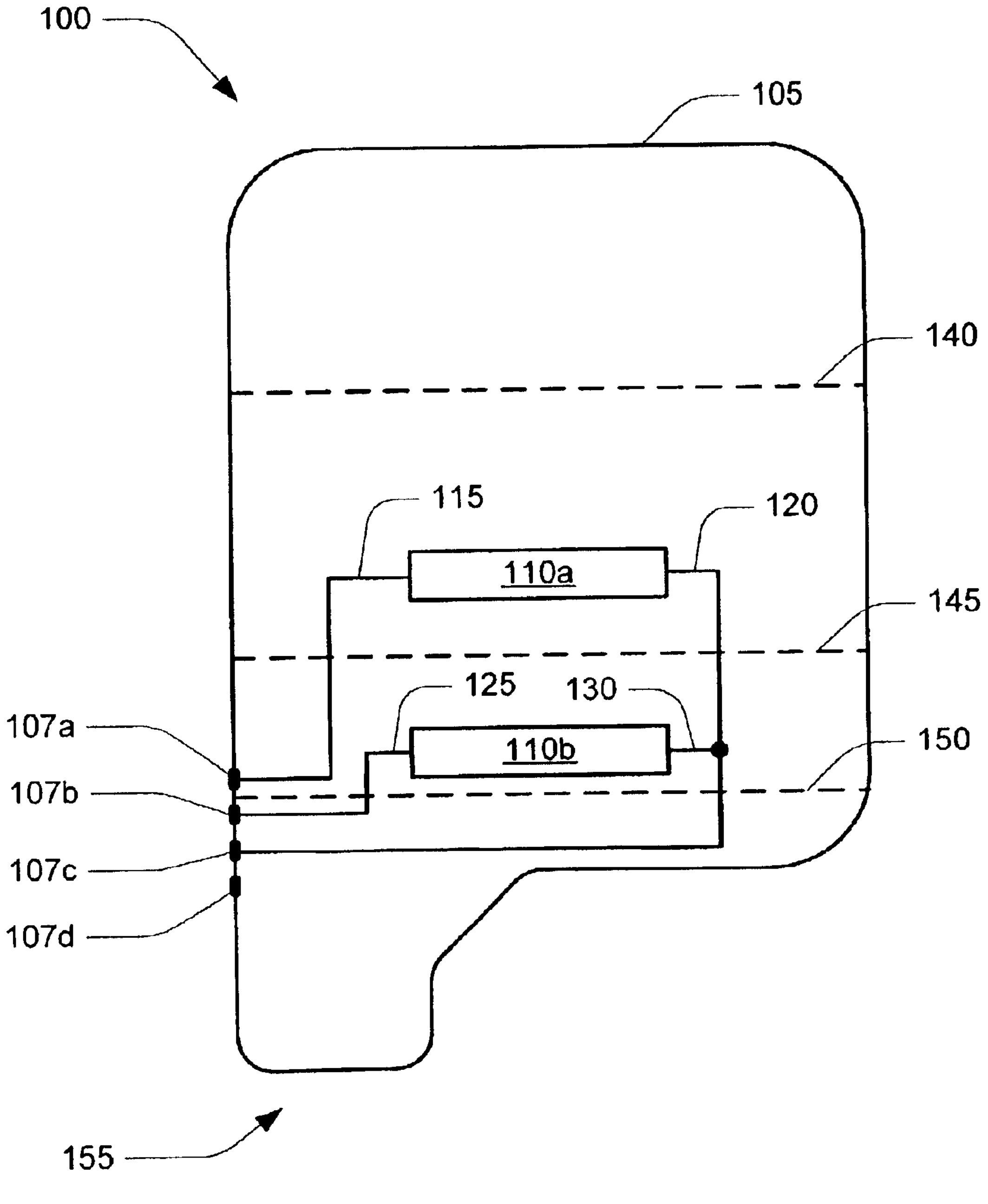
FIG. 3 is a cross-sectional view of an ink reservoir in accordance with one embodiment of the invention.

FIG. 3 is a cross-sectional view of an ink reservoir 100 in accordance with one embodiment of the invention. The ink reservoir 100 includes a body 105. The volume within the body 105 is adapted to contain ink. The area enclosed by body 105 may represent the cross-section of a one-color ink reservoir or an individual chamber of a multi-color ink reservoir, with each chamber having its own binary elements for detecting ink level. Thus, the various embodiments include one-color and multi-color ink reservoirs.

The body 105 contains one or more binary elements, such as binary elements 110*a* and 110*b*, for detection of ink level within the body 105. The binary elements 110*a–b* are any elements adapted to provide an electrical path when the element is in an initial state and to present an open circuit when the element is in a second state. For one embodiment, the binary elements 110*a–b* are fusible links. The concept of fusible links, or fuses, is well known. Fusible links are conductive traces, wires, strips and the like that provide an electrical path until an excessive electrical signal is applied to the link. When an electrical signal is applied to the fusible link having a current and duration exceeding the capacity of the fusible link, the conductive trace, wire, strip or the like will heat up to the point of melting, thus severing the link and presenting an open circuit.

To apply the electrical signals, the binary elements 110*a*–110*b* are coupled to one or more electrical contacts 107*a–c*. Additional electrical contacts, such as electrical contact 107*d*, are utilized by the printing system for such things as controlling ink ejectors of the printhead 155.

Binary element 11*a* is coupled to an electrical contact 107*a* through a lead 115 to receive an electrical signal as an applied electrical signal. The applied electrical signal will pass through the binary element 110*a* in its initial state and return on lead 120 to contact 107*c*. Binary element 110*b* is coupled to an electrical contact 107*b* through a lead 125 to receive an electrical signal as an applied electrical signal. The applied electrical signal will pass through the binary element 110*b* in its initial state and return on lead 130 to contact 107*c*. Although the embodiment of FIG. 3 shows each binary element 110*a–b* having its return signal coupled to an electrical contact 107*c*, each binary element 110*a* and 110*b* could have its return lead 120 and 130, respectively, coupled to an individual electrical contact 107.

The concept utilized herein is that a binary element 110*a–b* immersed in liquid, such as the ink, will have a higher electrical capacity than a binary element 110*a –b* exposed to air. This is due to the significantly higher rate of heat transfer from the binary element 110*a–b* to a liquid versus air. Because heat is dissipated more quickly in liquid, the binary elements 110*a–b* can handle a higher current before presenting an open circuit. If an electrical signal is periodically applied to the binary elements 110*a–b* that exceeds the capacity of the binary elements 110*a–b* if exposed to air, but is less than the capacity of the binary elements 110*a–b* if immersed in the ink, it can be determined when the ink level falls below an individual binary element 110*a–b* by monitoring for an open circuit in response to the electrical signal. It is recognized that as the ink level passes by the binary element, the binary element will, for a time, neither be totally immersed in ink or totally exposed to air. During this period, the heat dissipation characteristics will gradually change. Thus, the level of the binary element is that level where the binary element would be expected to change state and present an open circuit in response to the electrical signal regardless of whether the binary element is partially immersed in ink.

The desired current and duration of the electrical signal is that current and duration that will not exceed the capacity of the binary element in ink, but will exceed the capacity of the binary element 110*a–b* in air. It is noted that the desired current and duration is a range of current and duration levels dependent upon the chosen materials and relative heat transfer coefficients. For example, a binary element in air may be rated to carry 4A for 1 second or 8A for 0.2 seconds. The invention is not limited by any specific material choice as most conductive materials can operate as a fusible link with their capacity being controlled generally by controlling the minimum cross-sectional area of the link. However, the material should be chosen based on expected corrosion or other compatibility issues with the ink contained in the body 105 as the fusible link is preferably exposed directly to the ink. By utilizing multiple binary elements 110*a–b* at different levels within the body 105, the ink level can be monitored at various usage levels.

Prior to operation, the ink reservoir 100 would be filled with ink. Initially, the ink may have a level indicated by dashed line 140. At this initial level, each binary element 110*a–b* is below a level of the ink and, therefore, immersed in the ink when the ink reservoir 100 is installed in a printing system. Application of the electrical signal at the desired current and duration will not cause the binary elements 100*a–b* to present an open circuit. Because each of the binary elements 110*a–b* maintains an electrical path, it can be determined that the ink level is above a level of the binary element 110*a*, i.e., above the highest binary element.

As ink continues to be expelled from the body 105, the ink will eventually fall to a level indicated by dashed line 145. At this level, a first binary element 110*a* is above the level 145 of the ink and is thus exposed to air. Application of the electrical signal at the desired current and duration will cause the binary element 110*a* to heat to the point that it presents an open circuit. However, a second binary element 110*b* is still below the level 145 of the ink and is thus totally immersed in liquid. Application of the electrical signal at the desired current and duration will not cause the binary element 110*b* to heat to the point that it presents an open circuit. Because the binary element 110*a* presents an open circuit and the binary element 110*b* provides an electrical path, it can be determined that the ink level is approximately between a level of the binary element 110*a* and the binary element 110*b*.

As more ink is expelled from the body 105, the ink will eventually fall to a level indicated by dashed line 150. At this level, each binary element 110*a–b* is above the level 150 of the ink and thus exposed to air. Application of the electrical signal at the desired current and duration will cause the binary element 110*b* to heat to the point that it also presents an open circuit. Because the binary element 110*b* now also presents an open circuit, it can be determined that the ink level is approximately below a level of the binary element 110*b*. When the ink level is determined to be below a level of the lowest binary element, the ink reservoir 100 may be deemed to be empty. Alternatively, a further estimation of usage may be made using such indirect techniques as drop counting. Because the indirect estimation technique is started at a known level lower than the initial ink level, the indirect estimation technique can be generally more accurate than if it is utilized during the entire life of the ink reservoir 100.

Figure 4A:
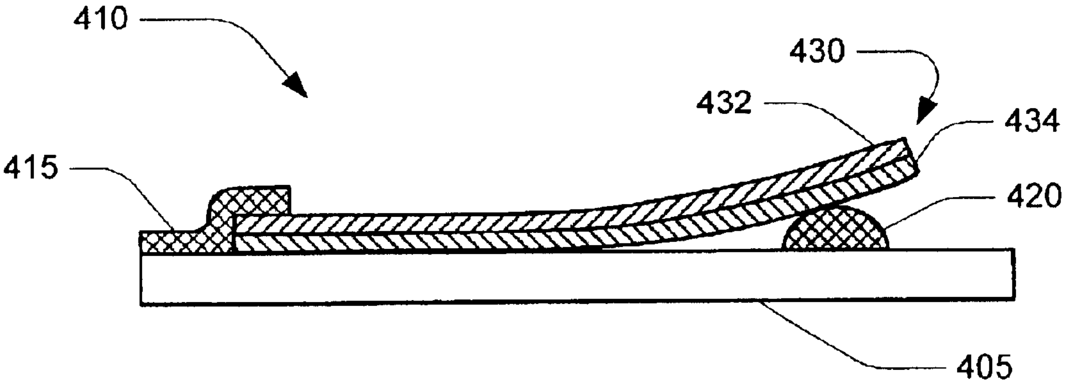
FIGS. 4A–4B are plan views of a binary element as a bimetal switch in accordance with one embodiment of the invention.
Figure 4B:
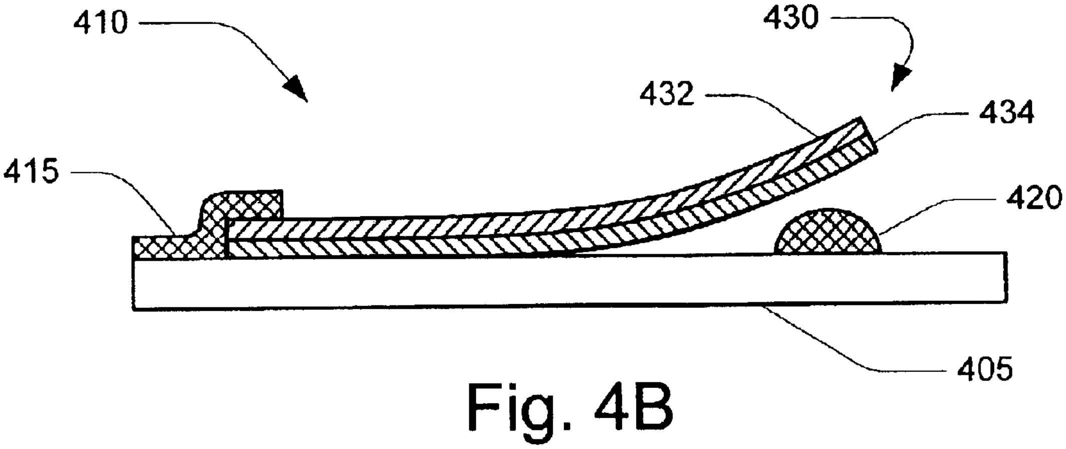

FIGS. 4A–4B are plan views of a binary element as a bimetal switch 410. In FIG. 4A, the bimetal switch is in its initial state. The bimetal switch 410 includes a bimetal element 430 coupled between a first lead 415 and a second lead 420 and mounted on a substrate 405, such as a wall of the body 105. The leads 415 and 420 would be coupled to electrical contacts 107 as described in the preceding paragraphs. The bimetal element 430 includes a first metal layer 432 bonded to a second metal layer 434. The metal layers 432 and 434 have differing coefficients of thermal expansion, with the first metal layer 432 having a lower coefficient of thermal expansion. In this manner, as the bimetal element 430 heats up, the first metal layer 432 will tend to expand less than the second metal layer 434, thus causing the bimetal element 430 to bend in a direction of the first metal layer 432. As shown in FIG. 4B, as the bimetal element 430 bends in the direction of the first metal layer 432, the bimetal element 430 will lift away from the lead 420, thus presenting an open circuit. When the electrical signal is removed, the bimetal element 430 will cool down, thus restoring the electrical path. By utilizing a multi-use binary element, such as bimetal switch 410, the ink reservoir could be refilled while still allowing for an indication of ink level during subsequent use. In the case of a fusible link, the ink reservoir would not provide the same functionality if it were to be refilled unless the fusible link were also replaced.

Figure 5:
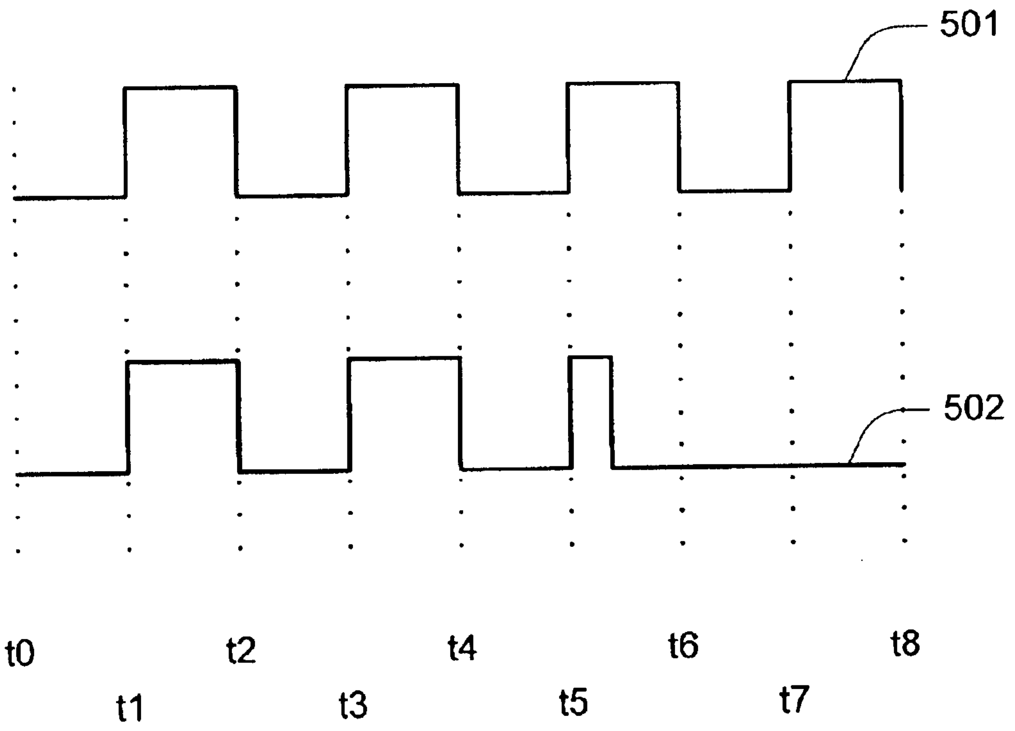
FIG. 5 shows signal traces of one embodiment of detecting ink level in accordance with the invention.

A variety of techniques could be utilized to determine when a binary element is presenting an open circuit. FIG. 5 shows signal traces of one embodiment of detecting ink level in accordance with the invention. Trace 501 represents an applied signal, such as might be applied to electrical contact 107*a* of FIG. 2. Trace 502 represents a return signal, such as might be sensed at electrical contact 107*c* of FIG. 2. During a time when the binary element 110*a* provides an electrical path, the trace 502 would be expected to be substantially identical to the trace 501. Although FIG. 5 shows the pulses of traces 501 and 502 to be essentially identical, it is recognized that resistive losses will cause some deterioration of the return signal.

As shown in FIG. 5, during the pulse of trace 501 beginning at time t5 and having a duration of t6–t5, the corresponding pulse of trace 502 is cut short. This would be an indication that the binary element is now presenting an open circuit as an electrical signal is being applied, but not returned. In addition to monitoring the return signal for voltage or current, detecting an open circuit could also be accomplished by monitoring voltage or current of the applied signal. For example, there will be no current draw of the applied signal if an open circuit is presented. Similarly, a constant current signal applied to a closed circuit will see a finite drop in voltage that will not be seen when applied to an open circuit.

For one embodiment, the electrical signals are applied periodically to the binary elements, e.g., every 10 seconds, once per minute, once every 5 minutes, etc. Alternatively, the electrical signals may be applied continuously, although this will result in an unnecessary power drain as the ink level within most ink reservoirs will not change rapidly even during heavy usage. The monitoring of ink level may be performed in response to the printing system being on, or only while it is processing a print job.

If an open circuit is detected on the applied signal side of the circuit, the return circuits of multiple binary elements may be coupled to a single contact while permitting simultaneous monitoring of each binary element, such as depicted in FIG. 4. To monitor for an open circuit on the return side of the circuit using a single return contact, simultaneous monitoring of multiple binary elements would generally require some means to identify which element is presenting an open circuit. For one embodiment, each element could be designed to have a different current capacity, e.g., with a first element having a current capacity of 1x, a second element having a current capacity of 2x and a third element having a current capacity of 4x, where x is some value of current. In this manner, by monitoring the current output on the return side of the circuit, it can be determined which binary elements are providing an electrical path and which are presenting an open circuit. For another embodiment, the electrical signals for the individual binary elements could be applied sequentially to determine which of the binary elements is presenting an open circuit while still permitting the use of a single return contact. Alternatively, each binary element could have a separate return contact. For yet another embodiment, the binary elements may have their inputs coupled together to receive a single applied signal while monitoring individual outputs to detect an open circuit.

Figure 6:
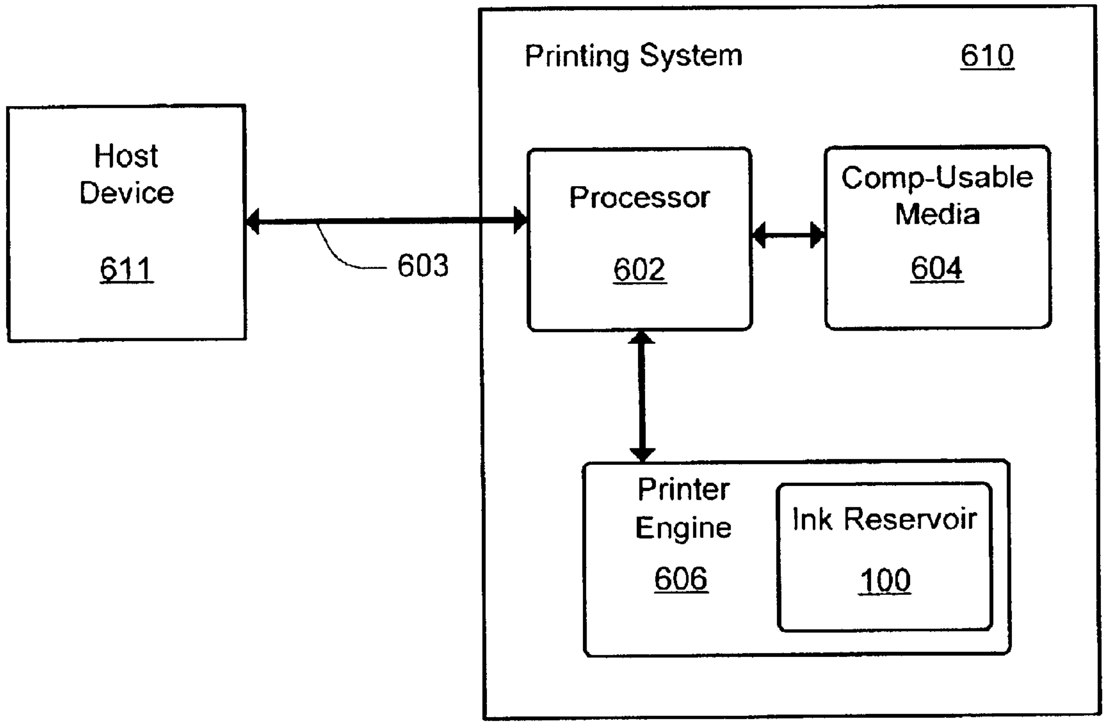
FIG. 6 is a block schematic of a printing system coupled to a host device in accordance with an embodiment of the invention.

FIG. 6 is a block schematic of a printing system 610 coupled to a host device 611, such as a personal computer, network server or other device external to the printing system 610, in accordance with an embodiment of the invention. The printing system 610 has a processor 602 for interpreting and rendering image data into a printable image. The printable image is provided to a print engine 606 to produce a tangible output image on a print media. The print engine 606 represents the mechanical aspects of the printing system 610. The image data for use by the processor 602 may be received via a communication port 603 from the host device 611 or stored on a computer-usable media 604. Similarly, the computer-usable media 604 may store printable images for use directly by the print engine 606 without further rendering by the processor 602. The printing system 610 can have more than one communication port 603. For example, the printing system 610 may have an IR (infrared) port and a USB (universal serial bus) port for access by one or more host devices 611.

The processor 602 is adapted to perform one or more methods of the various embodiments of the invention in response to computer-readable instructions. These computer-readable instructions may be in the form of either software, firmware or hardware. In a hardware solution, the instructions are hard coded as part of a processor, e.g., an application-specific integrated circuit (ASIC) chip. In a software or firmware solution, the instructions are stored on a separate computer-usable media 604 for retrieval by the processor 602. Some examples of computer-usable media include static or dynamic random access memory (SRAM or DRAM), read-only memory (ROM), electrically-erasable programmable ROM (EEPROM or flash memory), magnetic media and optical media, whether fixed or removable. Most computer applications are software solutions provided to the user on some removable computer-usable media, such as a compact disc read-only memory (CD-ROM).

For one embodiment, the processor 602, in response to the computer-readable instructions, is adapted to apply an electrical signal to a binary element contained within the ink reservoir 100, determine whether an electrical path is present through the binary element, and provide an indication of ink level in response to whether an electrical path is detected.

Figure 7:
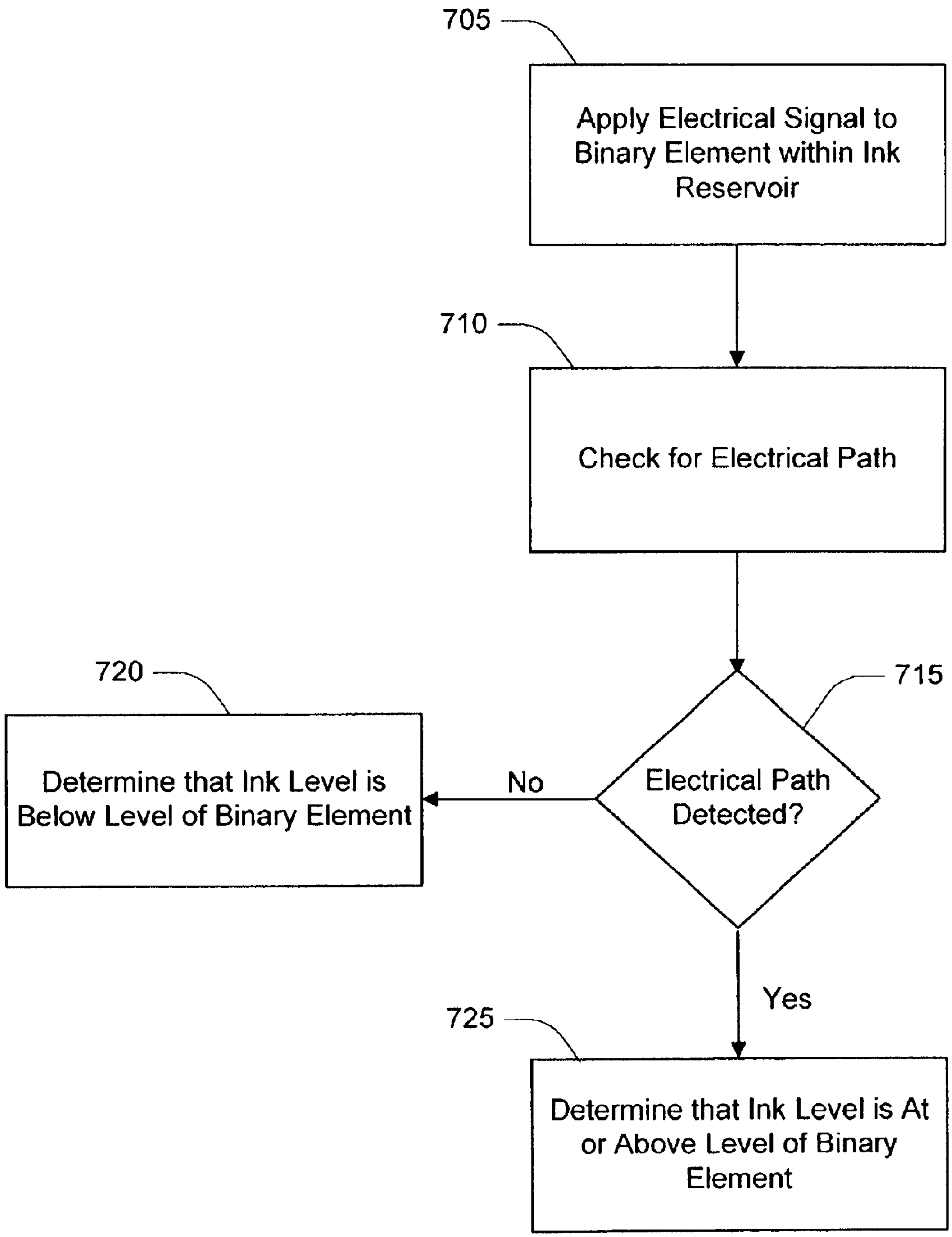
FIG. 7 is a flowchart of a method of sensing ink level within an ink reservoir in accordance with an embodiment of the invention.

FIG. 7 is a flowchart of a method of sensing ink level within an ink reservoir in accordance with an embodiment of the invention. At 705, an electrical signal is applied to a binary element within the ink reservoir. At 710, the electrical path through the binary element is checked. If no electrical path is detected at 715, i.e., an open circuit is detected, it is deemed at 720 that the ink level is below a level of the binary element. If an electrical path is detected at 715, it is deemed at 725 that the ink level is at or above a level of the binary element. The determination of ink level may be presented to a user of the printing system by any combination of audible or visual indications. For one embodiment, a tone may be sounded by the printing system when the ink level is deemed to be below the level of the binary element and a text message may be displayed on a control panel of the printing system, such as "Ink Level 25%." Alternatively, or in addition, audible and/or visual indications may be given to the user at the host device. For example, the printing system may direct the host device to sound a tone, present a text message on its user interface and/or present a graphic showing an ink cartridge having an ink level corresponding to the ink level of the sensed ink reservoir.

CONCLUSION

Ink reservoirs containing binary elements have been described herein to facilitate discrete sensing of ink level within the reservoir. The binary elements are adapted to provide an electrical path in response to an applied electrical signal if the element is immersed in the ink. The binary elements are further adapted to present an open circuit in response to the same applied electrical signal if the element is above a level of the ink. The binary elements may be single-use or multi-use elements, i.e., their state change may be irreversible or reversible, respectively. Based on the presence or absence of an electrical path, the ink level can be deemed to be at or above a level of the binary element, or below the level of the binary element, respectively.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. An ink reservoir for use in a printing system, comprising:

a compartment for containing ink; and a first binary element contained at a fixed level within the compartment;

wherein the first binary element is adapted to provide a closed electrical circuit in response to a first electrical signal applied to the first binary element while a liquid level within the compartment is above the first binary element; and wherein the first binary element is adapted to provide an open electrical circuit in response to the first electrical signal applied to the first binary element while the liquid level within the compartment is below the first binary element; and wherein the first binary element is a multi-use element.

2. The ink reservoir of claim 1, further comprising:

at least one additional binary element, wherein each additional binary element is contained at a fixed level within the compartment;

wherein each additional binary element is adapted to provide a closed electrical circuit in response to an electrical signal applied to that element while a liquid level within the compartment is above that element; and wherein each additional binary element is adapted to provide an open electrical circuit in response to the electrical signal applied to that element while the liquid level within the compartment is below that element.

3. The ink reservoir of claim 1, wherein each additional binary element is located at a fixed level different than the fixed level of the first binary element.

4. The ink reservoir of claim 1, wherein the multi-use element is a bimetal switch.

5. The ink reservoir of claim 4, wherein the first electrical signal is a periodic pulse having sufficient current and duration to open the bimetal switch if the bimetal switch is dry and having insufficient current and duration to open the bimetal switch if the bimetal switch is immersed in the ink.

6. The ink reservoir of claim 4, wherein the first electrical signal is a continuous signal having sufficient current to open the bimetal switch if the bimetal switch is dry and having insufficient current to open the bimetal switch if the bimetal switch is immersed in the ink.

7. A method of determining ink level in an ink reservoir, comprising:

applying an electrical signal to the ink reservoir;

supplying the electrical signal to a first binary element and a second binary element within the ink reservoir;

checking for a closed electrical circuit through the first binary element and through the second binary element;

determining that the ink level is above a first predetermined level if a closed circuit is detected through the first binary element;

determining that the ink level is at or below the first predetermined level if an open circuit is detected at the first binary element;

determining that the ink level is above a second predetermined level if a closed circuit is detected through the second binary element; and determining that the ink level is at or below the second predetermined level if an open circuit is detected at the second binary element;

wherein the second predetermined level is different than the first predetermined level.

8. The method of claim 7, wherein applying an electrical signal further comprises applying a periodic electrical pulse.

9. The method of claim 7, wherein applying an electrical signal further comprises applying a continuous electrical signal.

10. The method of claim 4, wherein checking for a closed electrical circuit through the first or second binary element further comprises checking a return signal for a match to the applied signal.

11. The method of claim 7, wherein checking for a closed electrical circuit through the first or second binary element further comprises checking a current of a return signal against an expected current.

12. The method of claim 7, wherein checking for a closed electrical circuit through the first or second binary element further comprises checking a current draw or a voltage drop of the applied signal.

13. A method of determining ink level in an ink reservoir, comprising:

applying a first electrical signal to a first binary element contained in the ink reservoir;

detecting whether an electrical path is provided through the first binary element;

determining that the ink level is above a level of the first binary element if an electrical path is detected; and determining that the ink level is below the level of the first binary element if an open circuit is detected.

14. The method of claim 13, wherein applying a first electrical signal further comprises applying either a periodic electrical pulse or a continuous electrical signal.

15. The method of claim 13, further comprising:

applying a second electrical signal to a second binary element contained in the ink reservoir;

detecting whether an electrical path is provided through the second binary element;

determining that the ink level is above a level of the second binary element if an electrical path is detected through the second binary element; and determining that the ink level is below the level of the second binary element if an open circuit is detected through the second binary element.

16. The method of claim 15, wherein applying the first electrical signal and the second electrical signal occur substantially concurrently.

17. The method of claim 15, further comprising:

discontinuing applying the first electrical signal after an open circuit is detected with the first binary element.

18. An ink reservoir for use in a printing system, comprising:

means for containing ink;

means for providing an electrical path through the means for containing ink; and wherein the means for providing an electrical path is adapted to present an open circuit in response to an electrical signal having a predetermined current and duration applied to the means for providing an electrical path if the means for providing an electrical path is located above a level of the ink during application of the electrical signal.

19. The ink reservoir of claim 18, wherein the means for providing an electrical path includes means for restoring the electrical path after presenting an open circuit.

20. An ink reservoir for use in a printing system, comprising:

a body for containing ink;

a plurality of electrical contacts on the body for communication with the printing system;

a printhead integral to the body for dispensing ink, the printhead responsive to control signals received from the printing system at a first portion of the plurality of electrical contacts;

a first binary element contained at a fixed level within the body and having an input coupled to a first electrical contact of a second portion of the plurality of electrical contacts and an output coupled to a second electrical contact of the second portion of the plurality of electrical contacts;

wherein the first binary element is adapted to provide a closed electrical circuit in response to a first electrical signal of predetermined current and duration applied to the first electrical contact while an ink level within the body is above the first binary element; and wherein the first binary element is adapted to provide an open electrical circuit in response to the first electrical signal of predetermined current and duration applied to the first electrical contact while the ink level within the body is below the first binary element.

21. The ink reservoir of claim 20, further comprising:

a second binary element contained at a fixed level within the body and having an input coupled to a third electrical contact of the second portion of the plurality of electrical contacts and an output coupled to the second electrical contact of the second portion of the plurality of electrical contacts;

wherein the second binary element is adapted to provide a closed electrical circuit in response to a second electrical signal of predetermined current and duration applied to the third electrical contact while an ink level within the body is above the second binary element; and wherein the second binary element is adapted to provide an open electrical circuit in response to the second electrical signal of predetermined current and duration applied to the third electrical contact while the ink level within the body is below the second binary element.

22. The ink reservoir of claim 20, further comprising:

a second binary element contained at a fixed level within the body and having an input coupled to a third electrical contact of the second portion of the plurality of electrical contacts and an output coupled to fourth electrical contact of the second portion of the plurality of electrical contacts;

wherein the second binary element is adapted to provide a closed electrical circuit in response to a second electrical signal of predetermined current and duration applied to the third electrical contact while an ink level within the body is above the second binary element; and wherein the second binary element is adapted to provide an open electrical circuit in response to the second electrical signal of predetermined current and duration applied to the third electrical contact while the ink level within the body is below the second binary element.

* * * * *

UNITED STATES PATENT AND TRADEMARK OFFICE

CERTIFICATE OF CORRECTION

PATENT NO. : 6,848,762 B2
APPLICATION NO. : 10/423357
DATED : February 1, 2005
INVENTOR(S) : King et al.

It is certified that error appears in the above-identified patent and that said Letters Patent is hereby corrected as shown below:

In the Claims

Col. 9 (line 4), delete “claim 4,” and insert therefor --claim 7,--.

Signed and Sealed this

Fifth Day of December, 2006

JON W. DUDAS

*Director of the United States Patent and Trademark Office*